United States Patent
Wu (10) Patent No.: US 9,749,049 B2
(45) Date of Patent: Aug. 29, 2017

(54) DOCSIS PROTOCOL-BASED ACCESS METHOD, APPARATUS, AND SYSTEM

(71) Applicant: HUAWEI TECHNOLOGIES CO., LTD., Shenzhen (CN)

(72) Inventor: Guangsheng Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 14/279,695

(22) Filed: May 16, 2014

(65) Prior Publication Data

US 2014/0248054 A1 Sep. 4, 2014

Related U.S. Application Data

(63) Continuation of application No. PCT/CN2011/082368, filed on Nov. 17, 2011.

(51) Int. Cl.
*H04J 14/00* (2006.01)
*H04B 10/2575* (2013.01)
(Continued)

(52) U.S. Cl.
CPC ....... *H04B 10/25751* (2013.01); *H04B 10/27* (2013.01); *H04L 12/413* (2013.01); *H04Q 11/0067* (2013.01); *H04Q 11/0071* (2013.01)

(58) Field of Classification Search
CPC .............. H04B 10/25751; H04B 10/27; H04B 10/2575; H04B 10/25; H04B 10/25759;
(Continued)

(56) References Cited

U.S. PATENT DOCUMENTS 8,831,425 B1 * 9/2014 Bernstein ........... H04B 10/2575
                                                          398/63
8,832,761 B2 * 9/2014 Wu ..................... H04L 41/0226
                                                          725/111
(Continued)

FOREIGN PATENT DOCUMENTS

CN            1774708 A      5/2006
CN          101702634 A      5/2010
(Continued)

OTHER PUBLICATIONS

Extended European Search Report issued Nov. 12, 2014 in corresponding European Patent Application No. 11875677.4.
(Continued)

*Primary Examiner* — Hibret Woldekidan
(74) *Attorney, Agent, or Firm* — Staas & Halsey LLP (57) ABSTRACT

Various embodiments of the present invention disclose a DOCSIS protocol-based access method, apparatus, and system. A first PON physical layer module is disposed inside or outside a CMTS device; the CMTS device receives DOCSIS protocol-based data, converts the DOCSIS protocol-based data into PON physical layer format-based data by using the first PON physical layer module, and sends the PON physical layer format-based data to a CMC through an optical distribution network; and the CMC receives the PON physical layer format-based data, converts the PON physical layer format-based data into DOCSIS physical layer format-based data, and sends the converted data to a terminal device. The solution provided by various embodiments of the present invention is applicable to a DOCSIS system.

12 Claims, 5 Drawing Sheets

(51) Int. Cl.
*H04Q 11/00* (2006.01)
*H04B 10/27* (2013.01)
*H04L 12/413* (2006.01)

(58) Field of Classification Search
CPC ............... H04L 12/413; H04L 12/2801; H04L 41/0226; H04Q 11/0067; H04Q 11/0071; H04Q 2011/0079
USPC ..................... 398/66, 67, 70–72, 74, 115
See application file for complete search history.

(56) References Cited

U.S. PATENT DOCUMENTS

| | | | |
|---|---|---|---|
| 9,025,954 B2* | 5/2015 | Fang | H04L 12/2801 370/210 |
| 9,025,960 B2* | 5/2015 | Fang | H04B 10/27 370/252 |
| 2004/0221032 A1 | 11/2004 | Bernstein et al. | |
| 2005/0175035 A1 | 8/2005 | Neely et al. | |
| 2006/0271988 A1* | 11/2006 | Chapman | H04H 20/78 725/111 |
| 2008/0310842 A1 | 12/2008 | Skrobko | |
| 2011/0069953 A1 | 3/2011 | Bronstein et al. | |
| 2011/0078755 A1* | 3/2011 | Dai | H04H 20/69 725/111 |
| 2011/0131624 A1 | 6/2011 | Wu et al. | |
| 2011/0257893 A1* | 10/2011 | Taylor | G01N 33/68 702/19 |
| 2012/0257891 A1* | 10/2012 | Boyd | H04L 47/6215 398/45 |
| 2012/0257893 A1* | 10/2012 | Boyd | H04L 12/2801 398/58 |
| 2013/0004155 A1* | 1/2013 | Liang | H04Q 11/0067 398/9 |
| 2013/0044766 A1* | 2/2013 | Pantelias | H04W 28/20 370/468 |
| 2015/0180576 A1* | 6/2015 | Boyd | H04L 12/2801 398/58 |
| 2015/0207826 A1* | 7/2015 | Fang | H04L 65/1073 398/72 |

FOREIGN PATENT DOCUMENTS

| | | |
|---|---|---|
| CN | 101997725 A | 3/2011 |
| CN | 102082684 A | 6/2011 |
| WO | 2011/031831 A1 | 3/2011 |
| WO | 2011/035680 A1 | 3/2011 |

OTHER PUBLICATIONS

"Cable Data Services DOCSIS® Provisioning of EPON Specifications DPoE® Architecture Specification", Feb. 25, 2011, XP055150780, pp. 1-66.

Chinese Office Action issued May 14, 2014 in corresponding Chinese Patent Application No. 201180002454.7.

Form PCT/ISA/210 issued Nov. 17, 2011 in corresponding PCT Application PCT/CN2011/082368.

IEEE Computer Society "Part 3: Carrier Sense Multiple Access with Collision Detection (CSMA/CD) Access Method and Physical Layer Specifications" Amendment 1: Physical Layer Specifications and Management Parameters for 10 Gb/s Passibe Optical Networks; IEEE Standard for Information Technology—Telecommunications and information exchange between systems—Local and metropolitan area networks—Specific Requirements, IEEE Std. 802.3av-2009, pp. 1-214.

"Data Over Cable Service Interface Specifications DOCSIS 3.0 Physical Layer Specification" CM-SP-PHYv3.0-I08-090121, pp. 1-161.

LAN/MAN Standards Committee of the IEEE Computer Society "Part 3: Carrier Sense Multiple Access with Collision Detection (CSMA/CD) Access Method and Physical Layer Specifications" Amendment 1: Physical Layer Specifications and Management Parameters for 10 Gb/s Passibe Optical Networks; IEEE Standard for Information Technology—Telecommunications and information exchange between systems—Local and metropolitan area networks—Specific Requirements, IEEE Std. 802.3av-2009, Jun. 9, 2005, pp. 1-594.

Part 3: Carrier Sense Multiple Access with Collision Detection (CSMA/CD) access method and physical layer specifications IEEE Standard for Information Technology—Telecommunications and information exchange between systems—Local and metropolitan area networks—Specific Requirements; Section Five, pp. 1- 417.

International Search Report mailed Sep. 13, 2012 in corresponding International Patent Application No. PCT/JP2011/082368.

* cited by examiner

DOCSIS PROTOCOL-BASED ACCESS METHOD, APPARATUS, AND SYSTEM

CROSS-REFERENCE TO RELATED APPLICATIONS

This application is a continuation of International Application No. PCT/CN2011/082368, filed on Nov. 17, 2011, which is hereby incorporated by reference in its entirety.

TECHNICAL FIELD

The present invention relates to the field of communication network technologies, and in particular, to a DOCSIS protocol-based access method, apparatus, and system.

BACKGROUND

Data Over Cable Service Interface Specification (DOCSIS) mainly supports implementation of transmission of an IP data packet between a computer network and a cable television network and between a cable television front end and a user.

The DOCSIS, as a main two-way broadband access technology of North America and European cable operators and China Broadcast & Television, has been widely used. Because of demands for high definition, interaction, 3D video services and broadband Internet access services and demands for cable network operation and maintenance management and energy saving and emission reduction, the DOCSIS technology is required to provide higher access rates, support more users, and have higher device integration levels. Meanwhile, with the popularization of the Ethernet passive optical network (EPON) in application markets of FTTB (Fiber to The Building)/FTTC (Fiber to The Curb)/FTTH (Fiber to The Home), the EPON is widely used in cable broadband access gradually. Cable access network fibers and coaxial cables coexist, and an innovative architecture needs to be proposed to merge technical systems of DOCSIS and PON in network evolution of cable networks in a better way. The industry has already proposed a DOCSIS EOC (Ethernet over Coax) solution, and has already done or is establishing standards.

In a network system adopting the DOCSIS EOC technology, a radio-frequency head-end device is moved down to approach a user-side device. In addition, an Optical Line Terminal (OLT) provides a data packet ingress and egress at a side of a broadband network, and uses an Ethernet passive optical network over coax physical layer (EPON over Coax PHY, EPOC) protocol stack to serve a cable leading to multiple users. In order to provide a service of a coaxial cable transmission radio-frequency signal, a Coax Media Converter (CMC) provides a bridging function from an EPON domain to a DOCSIS domain. That is, the CMC uses an embedded optical network unit (ONU) to terminate the EPON protocol, and uses a DOCSIS MAC (Media Access Control) layer and PHY (Physical Layer, physical layer) technology in a cable television modem termination system device to initiate the DOCSIS protocol.

However, when a data packet is transferred by adopting the prior art, a whole system is divided into an EPON domain and a DOCSIS domain which are independent, in which case end-to-end cannot be achieved, efficiency is low, service quality is difficult to ensure, and further, a bandwidth of the EPON is difficult to meet requirements.

In another solution, an EPON MAC layer technology and a coaxial cable Orthogonal Frequency Division Multiplexing (OFDM) physical layer technology are adopted, and the system includes an OLT, a CMC (or a CLT-coax line terminal), and a CNU. The CMC (or CLT) is a coax media conversion device, implements physical layer optical-to-electrical conversion, and converts an EPON physical layer into a coax physical layer. The Coax Network Unit (CNU) is a user-end device having a coax physical layer and an EPON MAC.

The MAC of the OLT may directly pass through the CMC, that is, the CMC does not terminate the EPON MAC, and the OLT can directly manage the CNU through the MAC layer. However, efficiency is not necessarily high when the EPON MAC is used for the coaxial channel, and the coaxial channel needs real-time channel measurement, so that it is inevitable to modify the EPON MAC.

Direct optical-to-electrical physical layer conversion in the CMC (or CLT) is very difficult. Features of an optical channel are stable, while features of a coaxial channel are unstable because of noise interferences, frequency selectivity, and cable and branch distributor features. Information transferring efficiency of the coaxial channel can be improved only if the coaxial channel adopts technologies such as channel measurement and bit loading, where channel changes and noise changes need to be detected in real time, and each available channel and the number of bits carried by the available channels are refreshed regularly.

Based on the above, when the data packet is transferred by adopting the prior art, the whole system is divided into an EPON domain and a DOCSIS domain which are independent, in which case end-to-end cannot be achieved, and efficiency is low.

SUMMARY

Embodiments of the present invention provide a DOCSIS protocol-based access method, apparatus, and system, so that a point-to-multipoint PON topological structure is supported by a physical connection between a DOCSIS CMTS and an optical node, and system efficiency is improved.

In order to achieve the above objective, the following technical solutions are adopted in the embodiments of the present invention.

A Data Over Cable Service Interface Specification DOCSIS protocol-based access system includes a cable modem termination system CMTS device and a coax media converter CMC, where a first passive optical network PON physical layer module is disposed inside or outside the CMTS device;

the CMTS device is configured to receive DOCSIS protocol-based data, convert the DOCSIS protocol-based data into PON physical layer format-based data by using the first PON physical layer module, and send the PON physical layer format-based data to the CMC through an optical distribution network; and the CMC is configured to receive the PON physical layer format-based data, convert the PON physical layer format-based data into DOCSIS physical layer format-based data, and send the converted data to a terminal device.

A cable modem termination system CMTS device includes a DOCSIS media access control MAC module and a passive optical network PON physical layer module; where the DOCSIS MAC module is provided with a downstream external physical layer interface DEPI and an upstream external physical layer interface UEPI, where the DEPI and the UEPI are configured to connect to the PON physical layer module; and the DOCSIS MAC module is configured to send Data Over Cable Service Interface Specification DOCSIS protocol-based data to the PON physical layer module by using the DEPI, and receive DOCSIS protocol-based data from the PON physical layer module by using the UEPI; and the PON physical layer module is provided with at least one PON interface, where the PON interface is configured to connect to a passive optical distribution network; and the PON physical layer module is configured to convert PON physical layer format-based data from the passive optical distribution network into DOCSIS protocol-based data; and is configured to modulate the data from the DOCSIS MAC module into PON physical layer format-based data, and send the PON physical layer format-based data to a coax media converter CMC through the optical distribution network.

A coax media converter includes:

a passive optical network PON physical layer module, configured to receive and send PON physical layer format-based data;

a PON adaptation module, configured to forward the PON physical layer format-based data from the PON physical layer module to a DOCSIS physical layer module after finishing packet caching, traffic classification, filtering, and rate matching;

the DOCSIS physical layer module, configured to finish processing of a downstream multichannel physical layer signal, output Data Over Cable Service Interface Specification DOCSIS physical layer format-based data, and send the DOCSIS physical layer format-based data to a radio-frequency module; and receive DOCSIS physical layer format-based data of the radio-frequency module, finish processing of an upstream multichannel physical layer signal, and send the processed signal to the PON adaptation module; and the radio-frequency module, configured to modulate the DOCSIS physical layer format-based data to a radio-frequency interface and send it to a terminal device.

A Data Over Cable Service Interface Specification DOCSIS protocol-based access method includes:

receiving DOCSIS protocol-based data on a media access control MAC layer;

converting the DOCSIS protocol-based data into PON physical layer format-based data by using a passive optical network PON physical layer module disposed inside or outside; and sending the PON physical layer format-based data to a PON optical module, and sending, by the PON optical module, the PON physical layer format-based data to a coax media converter by using a fiber.

In the DOCSIS protocol-based access method, apparatus, and system provided by the embodiments of the present invention, a first passive optical network PON physical layer module is disposed inside or outside a CMTS device; the CMTS device is configured to receive DOCSIS protocol-based data, convert the DOCSIS protocol-based data into PON physical layer format-based data by using the first PON physical layer module, and send the PON physical layer format-based data to the CMC through an optical distribution network; and the CMC is configured to receive the PON physical layer format-based data, convert the PON physical layer format-based data into DOCSIS physical layer format-based data, and send the converted data to a terminal device. Compared with the prior art that, when a data packet is transferred, a whole system is divided into an EPON domain and a DOCSIS domain which are independent, in which case end-to-end cannot be achieved, and efficiency is low, in the solutions provided by the embodiments of the present invention, a first PON physical layer module is disposed inside or outside a CMTS device, so that a point-to-multipoint PON topological structure is supported by a physical connection between a DOCSIS CMTS and an optical node, and system efficiency is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
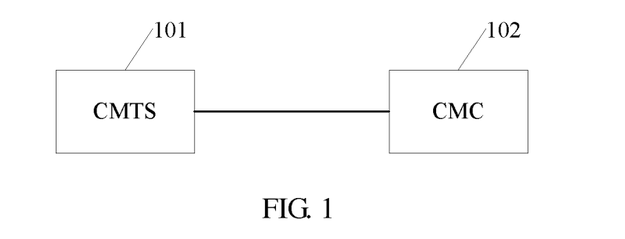
FIG. 1 is a schematic diagram of a DOCSIS protocol-based access system according to Embodiment 1 of the present invention.

An embodiment of the present invention provides a DOCSIS protocol-based access system. As shown in FIG. 1, the system includes a CMTS device 101 and a CMC 102.

A first Passive optical network, passive optical network (PON) physical layer module is disposed inside or outside the Cable Modem Termination System (CMTS) device 101.

The CMTS device 101 is configured to receive DOCSIS protocol-based data, convert the DOCSIS protocol-based data into PON physical layer format-based data by using the first PON physical layer module, and send the PON physical layer format-based data to the Coax Media Converter (CMC) 102 through an optical distribution network.

The CMC 102 is configured to receive the PON physical layer format-based data, convert the PON physical layer format-based data into DOCSIS physical layer format-based data, and send the converted data to a terminal device.

In the DOCSIS protocol-based access system provided by the embodiment of the present invention, a first passive optical network PON physical layer module is disposed inside or outside a CMTS device; the CMTS device is configured to receive DOCSIS protocol-based data, convert the DOCSIS protocol-based data into PON physical layer format-based data by using the first PON physical layer module, and send the PON physical layer format-based data to the CMC through an optical distribution network; and the CMC is configured to receive the PON physical layer format-based data, convert the PON physical layer format-based data into DOCSIS physical layer format-based data, and send the converted data to a terminal device. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

Figure 2:
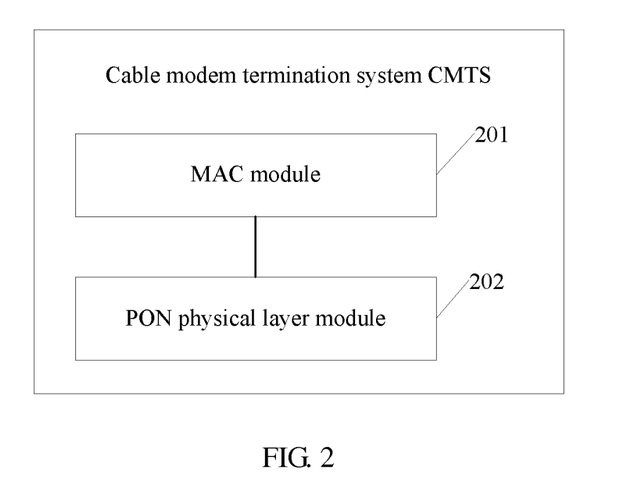
FIG. 2 is a schematic diagram of a CMTS device according to Embodiment 1 of the present invention.

An embodiment of the present invention provides a CMTS device. As shown in FIG. 2, the CMTS device includes a DOCSIS MAC module 201 and a PON physical layer module 202.

The DOCSIS MAC module 201 is provided with a Downstream External PHY Interface (DEPI) and a Upstream External PHY Interface (UEPI), where the DEPI and the UEPI are configured to connect to the PON physical layer module 202, and the DOCSIS MAC module 201 is configured to send DOCSIS protocol-based data to the PON physical layer module 202 by using the DEPI, and receive DOCSIS protocol-based data from the PON physical layer module 202 by using the UEPI.

The PON physical layer module 202 is provided with at least one PON interface, where the PON interface is configured to connect to a passive optical distribution network. The PON physical layer module 202 is configured to convert PON physical layer format-based data from the passive optical distribution network into DOCSIS protocol-based data; and is configured to modulate the data from the DOCSIS MAC module into PON physical layer format-based data, and send the PON physical layer format-based data to a coax media converter CMC through the optical distribution network.

Specifically, the PON physical layer module 202 may be a 10 G EPON physical layer module.

In the CMTS device provided by the embodiment of the present invention, a PON physical layer module is connected by using a DEPI and a UEPI provided on a DOCSIS MAC module. The DOCSIS MAC module sends DOCSIS protocol-based data to the PON physical layer module by using the DEPI, and receives DOCSIS protocol-based data from the PON physical layer module by using the UEPI. The PON physical layer module is configured to convert PON physical layer format-based data from a passive optical distribution network into DOCSIS protocol-based data; and is configured to modulate the data from the DOCSIS MAC module into PON physical layer format-based data, and send the PON physical layer format-based data to a coax media converter CMC through the optical distribution network. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

Figure 3:
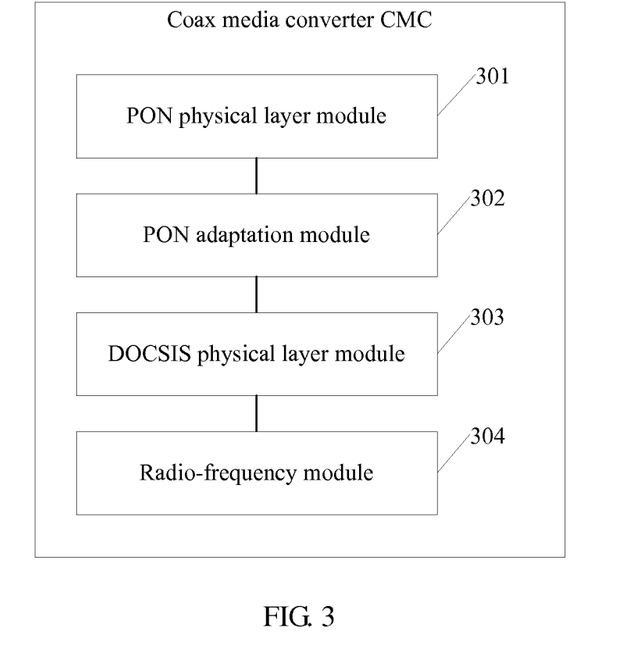
FIG. 3 is a schematic diagram of a CMC according to Embodiment 1 of the present invention.

An embodiment of the present invention provides a coax media converter CMC. As shown in FIG. 3, the CMC includes a PON physical layer module 301, a PON adaptation module 302, a DOCSIS physical layer module 303, and a radio-frequency module 304.

The PON physical layer module 301 is configured to receive and send PON physical layer format-based data.

The PON adaptation module 302 may be a field programmable gate array or an integrated circuit ASIC chip, and is configured to forward the PON physical layer format-based data from the PON physical layer module to the DOCSIS physical layer module 303 after finishing packet caching, traffic classification, filtering, and rate matching.

The DOCSIS physical layer module 303 is configured to finish processing of a downstream multichannel physical layer signal, output DOCSIS physical layer format-based data, and send the DOCSIS physical layer format-based data to the radio-frequency module 304; and receive DOCSIS physical layer format-based data of the radio-frequency module 304, finish processing of an upstream multichannel physical layer signal, and sends the processed signal to the PON adaptation module 302.

The radio-frequency module 304 is configured to modulate the DOCSIS physical layer format-based data to a radio-frequency interface and send it to a terminal device.

It should be noted that, the CMC further includes a video relay module, configured to separate out an analog radio-frequency signal, and convert the analog radio-frequency signal into a video radio-frequency signal by using an analog optical receiver.

In the CMS provided by the embodiment of the present invention, a PON physical layer module receives PON physical layer format-based data; a PON adaptation module forwards the PON physical layer format-based data from the PON physical layer module to a DOCSIS physical layer module after finishing packet caching, traffic classification, filtering, and rate matching; the DOCSIS physical layer module finishes processing of a downstream multichannel physical layer signal, outputs Data Over Cable Service Interface Specification DOCSIS physical layer format-based data, and sends the DOCSIS physical layer format-based data to a radio-frequency module, and receives the DOCSIS physical layer format-based data of the radio-frequency module, finishes processing of an upstream multichannel physical layer signal, and sends the processed signal to the PON adaptation module; and the radio-frequency module is configured to modulate the DOCSIS physical layer format-based data to a radio-frequency interface and send it to a terminal device. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

Figure 4:
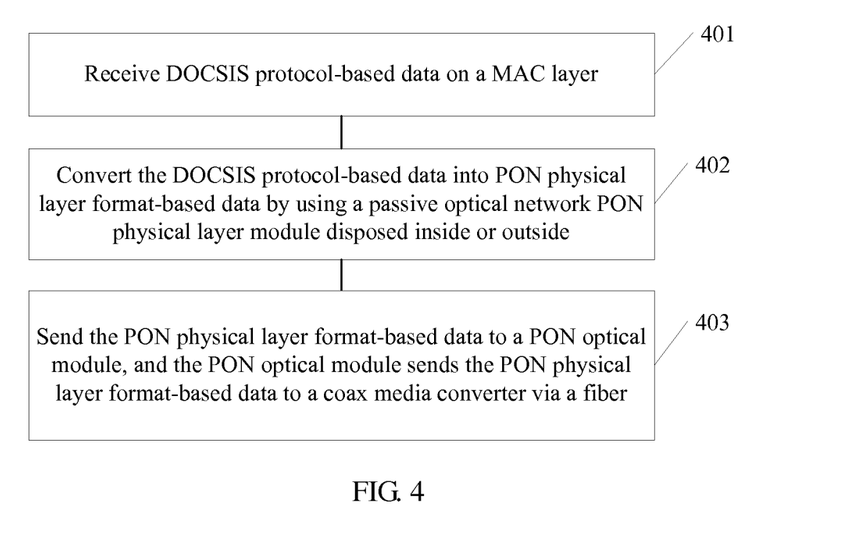
FIG. 4 is a flowchart of a DOCSIS protocol-based access method according to Embodiment 1 of the present invention.

An embodiment of the present invention provides a DOCSIS protocol-based access method. As shown in FIG. 4, the method includes the following steps.

Step 401: Receive DOCSIS protocol-based data on a MAC layer.

Step 402: Convert the DOCSIS protocol-based data into PON physical layer format-based data by using a passive optical network PON physical layer module disposed inside or outside.

It should be noted that, the PON physical layer module is disposed inside or outside the CMTS. Specifically, the PON physical layer module is a 10 G EPON physical layer module.

Step 403: Send the PON physical layer format-based data to a PON optical module, and the PON optical module sends the PON physical layer format-based data to a coax media converter by using a fiber.

In the DOCSIS protocol-based access method provided by the embodiment of the present invention, DOCSIS protocol-based data is received on a MAC layer, then the DOCSIS protocol-based data is converted into PON physical layer format-based data by a PON physical layer module, and the PON physical layer format-based data is sent to a PON optical module, and the PON optical module sends the PON physical layer format-based data to a coax media converter by using a fiber. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

Embodiment 2

Figure 5:
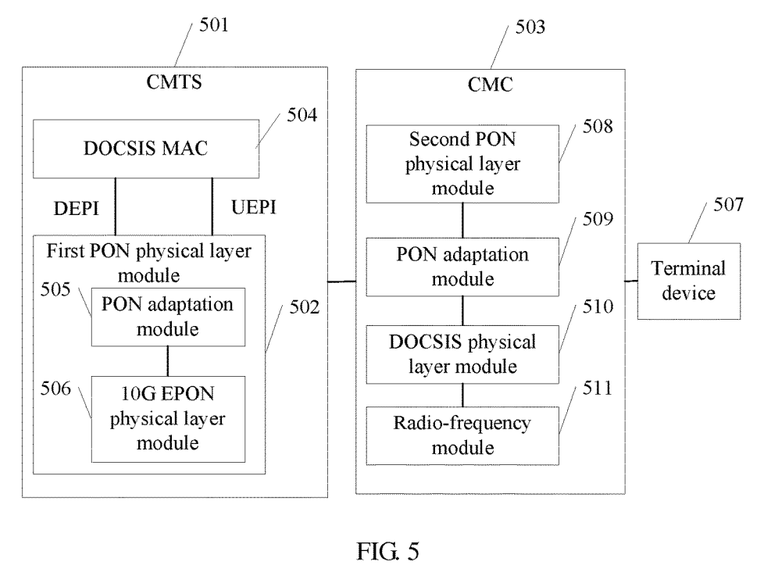
FIG. 5 is a schematic diagram of a DOCSIS protocol-based access system according to Embodiment 2 of the present invention.

An embodiment of the present invention provides a DOCSIS protocol-based access system. As shown in FIG. 5, the system includes a CMTS device 501, a first PON physical layer module 502, a CMC 503, a DOCSIS MAC module 504, a PON adaptation module 505 (a PON adaptation module in the CMTS device), a 10 G EPON physical layer module 506, a terminal device 507, a second PON physical layer module 508, a PON adaptation module 509 (an adaptation module in the CMC, a DOCSIS physical layer module 510, and a radio-frequency module 511.

The first passive optical network PON physical layer module 502 is disposed inside or outside the CMTS device 501. The CMTS device 501 receives DOCSIS protocol-based data, converts the DOCSIS protocol-based data into PON physical layer format-based data by using the first PON physical layer module, and sends the PON physical layer format-based data to the CMC 503 through an optical distribution network.

It should be noted that, the CMTS device 501 includes the DOCSIS MAC module 504, and the DOCSIS MAC module 504 is connected to the first PON physical layer module 502 by using a downstream external physical layer interface DEPI and an upstream external physical layer interface UEPI.

The DEPI can support eight to sixteen downstream physical channel bindings of 6 MHz or 8 MHz, where different DEPIs correspond to different logical channel numbers, and the different DEPIs are identified by using different downstream service groups DS-SGs. The UEPI supports four upstream physical channel bindings of Advanced Time Division Multiple Access (A-TDMA) or Synchronism Code Division Multiple Access (S-CDMA), where different UEPIs correspond to different logical channel numbers, and the different UEPIs are identified by different upstream service groups US-SGs.

Further, the first PON physical layer module 502 includes the PON adaptation module 505 and the 10 G EPON physical layer module 506. Specifically, the PON adaptation module 505 is connected to the DEPI and the UEPI, and is connected to the 10 G EPON physical layer module 506 by using an SFI-4 interface. The PON adaptation module 505 is configured to implement conversion of interfaces between the DOCSIS MAC module 504 and the 10 G EPON physical layer module 506. The 10 G EPON physical layer module 506 is configured to modulate the DOCSIS protocol-based data into the PON physical layer format-based data, and send the PON physical layer format-based data to the CMC 503 through the optical distribution network.

It should be noted that, a 10 G EPON line unit is adopted, and an RF line card that occupies most slots can be removed from the CMTS 501, so that capacity and an integration level of the CMTS device are improved, the number of supported CMs is increased, and power consumption of the device is reduced significantly. For example, there are twelve 10 G EPON line cards, each line card provides four PON interfaces, where a PON branch ratio is 1:16, and the CMC supports 500 CM. In this way, the CMTS device can cover 12*4*16*500=384K CMs at most.

The CMC 503 receives the PON physical layer format-based data, converts the PON physical layer format-based data into DOCSIS physical layer format-based data, and sends the converted data to the terminal device 507.

Further, the second PON physical layer module 508, the PON adaptation module 509, the DOCSIS physical layer module 510, and the radio-frequency module 511 are disposed inside the CMC 503.

The second PON physical layer module 508 is configured to receive the PON physical layer format-based data from the CMTS device, and send the received data to the PON adaptation module 509.

The PON adaptation module 509 is configured to forward the data from the second PON physical layer module 508 to the DOCSIS physical layer module 510 after finishing packet caching, traffic classification, filtering, and rate matching. It should be noted that, the PON adaptation module 509 may be a field programmable gate array or an integrated circuit ASIC chip.

The DOCSIS physical layer module 510 finishes processing of a downstream channel physical layer signal, converts it into DOCSIS physical layer format-based data, and sends the converted data to the radio-frequency module 511.

The radio-frequency module 511 is configured to modulate the DOCSIS physical layer format-based data to a radio-frequency interface and send it to the terminal device 507.

The radio-frequency module 511 is further configured to receive an upstream channel physical layer signal sent by the terminal device 507, modulate the upstream channel physical layer signal into DOCSIS physical layer format-based data by using the radio-frequency interface, and then send the DOCSIS physical layer format-based data to the DOCSIS physical layer module 510.

The DOCSIS physical layer module 510 is further configured to receive the DOCSIS physical layer format-based data of the radio-frequency module 511, finish processing of an upstream multichannel physical layer signal, and send the processed signal to the PON adaptation module 509.

The PON adaptation module 509 is further configured to perform scheduling and traffic shaping on the received signal after the processing of the upstream channel physical layer signal, add a specific logical channel number, and send the signal to a PON physical layer chip, convert the signal into PON physical layer format-based data, and send the data to the second PON physical layer module 508.

In addition, the CMC is further configured to separate out an analog radio-frequency signal, and convert the analog radio-frequency signal into a video radio-frequency signal by using an analog optical receiver.

Figure 6:
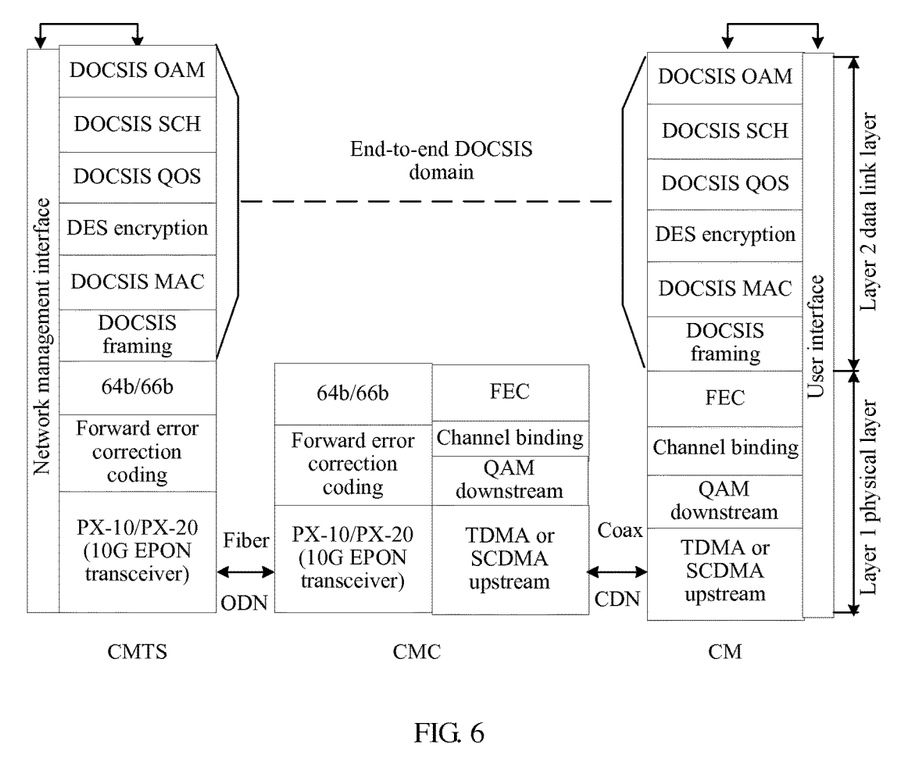
FIG. 6 is a schematic diagram of a system protocol layer according to Embodiment 2 of the present invention.

It should be noted that, an embodiment of the present invention provides a system protocol layer. As shown in FIG. 6, an architecture of a DOCSIS system provided by the embodiment of the present invention is completely compatible with the DOCSIS protocol. The DOCSIS system is scheduled by the DOCSIS protocol, and a domain from the CMTS device to the terminal device in the architecture of the DOCSIS system is an end-to-end DOCSIS domain. At the side of the CMTS, the DOCSIS protocol is adopted above the MAC layer, the physical layer adopts a 10 G EPON physical layer, that is, 64/66b coding and 10 G EPON PMD (Physical Media Dependent) are adopted. The CMC finishes conversion from a 10 G EPON physical layer to a radio-frequency unit physical layer, namely, resolves data of the 10 G EPON physical layer, and converts the data into DOCSIS physical layer data. Therefore, system efficiency can be improved and desirable service quality can be ensured.

In the DOCSIS protocol-based access system provided by the embodiment of the present invention, a first passive optical network PON physical layer module is disposed inside or outside a CMTS device; the CMTS device is configured to receive DOCSIS protocol-based data, convert the DOCSIS protocol-based data into PON physical layer format-based data by using the first PON physical layer module, and send the PON physical layer format-based data to the CMC through an optical distribution network; and the CMC is configured to receive the PON physical layer format-based data, convert the PON physical layer format-based data into DOCSIS physical layer format-based data, and send the converted data to a terminal device. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

Figure 7:
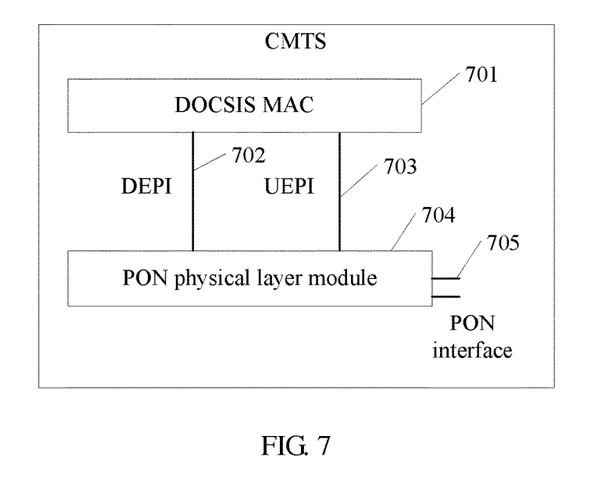
FIG. 7 is a schematic diagram of a CMTS device according to Embodiment 2 of the present invention.

An embodiment of the present invention provides a CMTS device, and the CMTS device is the CMTS device in service 5. Specifically, as shown in FIG. 7, the CMTS device includes: a DOCSIS MAC module 701, a DEPI 702, a UEPI 703, a PON physical layer module 704, and a PON interface 705.

The DOCSIS MAC module 701 is provided with the downstream external physical layer interface DEPI 702 and the upstream external physical layer interface UEPI 703, where the DEPI and the UEPI are configured to connect to the PON physical layer module 704.

The DOCSIS MAC module 701 is configured to send Data Over Cable Service Interface Specification DOCSIS protocol-based data to the PON physical layer module 702 by using the DEPI, and receive DOCSIS protocol-based data from the PON physical layer module 702 by using the UEPI.

It should be noted that, the DEPI 702 can support eight to sixteen downstream physical channel bindings of 6 MHz or 8 MHz, where different DEPIs 702 correspond to different logical channel numbers, and the different DEPIs 702 are identified by using different downstream service groups DS-SGs. The UEPI 703 supports four upstream physical channel bindings of A-TDMA or S-CDMA, where different UEPIs 703 correspond to different logical channel numbers, and the different UEPIs 703 are identified by different upstream service groups US-SGs.

The PON physical layer module 704 is provided with at least one PON interface 705, where the PON interface 705 is configured to connect to a passive optical distribution network. The PON physical layer module 704 is configured to convert PON physical layer format-based data from the passive optical distribution network into DOCSIS protocol-based data; and is configured to modulate the data from the DOCSIS MAC module 701 into PON physical layer format-based data, and send the PON physical layer format-based data to a coax media converter CMC through the optical distribution network.

Specifically, the PON physical layer module is a 10 G EPON physical layer module. It should be noted that, a 10 G EPON line unit is adopted, and an RF line card that occupies most slots can be removed from the CMTS device, so that capacity and an integration level of the CMTS device are improved, the number of supported CMs is increased, and power consumption of the device is reduced significantly. For example, there are twelve 10 G EPON line cards, each line card provides four PON interfaces, where a PON branch ratio is 1:16, and the CMC supports 500 CM devices. In this way, the CMTS device can cover 12*4*16*500=384K CMs at most.

In the CMTS device provided by the embodiment of the present invention, the DOCSIS MAC module is configured to send Data Over Cable Service Interface Specification DOCSIS protocol-based data to the PON physical layer module by using the DEPI, and receive the DOCSIS protocol-based data from the PON physical layer module by using the UEPI; and the PON physical layer module is configured to convert the PON physical layer format-based data from the passive optical distribution network into DOCSIS protocol-based data; and is configured to modulate the data from the DOCSIS MAC module into PON physical layer format-based data, and send the PON physical layer format-based data to a coax media converter CMC through the optical distribution network. Compared with the prior art that, when a data packet is transferred, a whole system is divided into an EPON domain and a DOCSIS domain which are independent, in which case end-to-end cannot be achieved, efficiency is low, and capacity of a CMTS device is low, in the solution provided by the embodiments of the present invention, a first PON physical layer module is disposed inside or outside a CMTS device, so that a point-to-multipoint PON topological structure is supported by a physical connection between a DOCSIS CMTS and an optical node, system efficiency is improved, and capacity of a CMTS device is improved.

Figure 8:
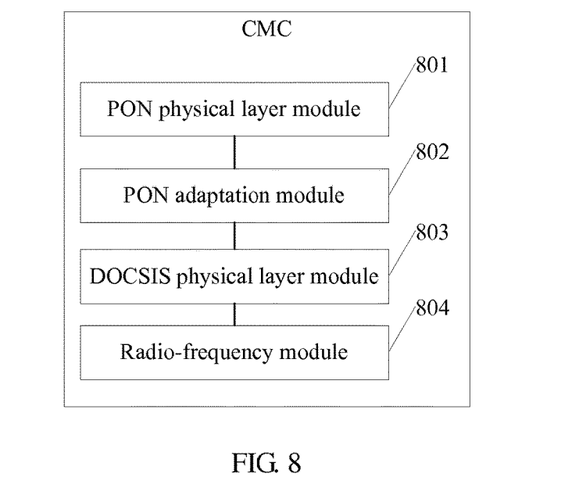
FIG. 8 is a schematic diagram of a CMC according to Embodiment 2 of the present invention.

An embodiment of the present invention provides a coax media converter CMC, and the CMC is the CMC in service 5. Specifically, as shown in FIG. 8, the device includes: a PON physical layer module 801, a PON adaptation module 802, a DOCSIS physical layer module 803, and a radio-frequency module 804.

The passive optical network PON physical layer module 801 is configured to receive and send PON physical layer format-based data; and specifically, receive the PON physical layer format-based data by using a PON interface, and send the PON physical layer format-based data to the PON adaptation module 802.

The PON adaptation module 802 is configured to forward the PON physical layer format-based data from the PON physical layer module in a CMTS device to the DOCSIS physical layer module 803 after finishing packet caching, traffic classification, filtering, and rate matching. Specifically, the PON adaptation module 802 is a field programmable gate array or an integrated circuit ASIC chip.

The DOCSIS physical layer module 803 finishes processing of a downstream multichannel physical layer signal, outputs DOCSIS physical layer format-based data, and sends the DOCSIS physical layer format-based data to the radio-frequency module 804.

The radio-frequency module 804 is configured to modulate the DOCSIS physical layer format-based data to a radio-frequency interface and send it to a terminal device.

In addition, the radio-frequency module 804 is further configured to receive an upstream channel physical layer signal sent by the terminal device, modulate the upstream channel physical layer signal into DOCSIS physical layer format-based data by using the radio-frequency interface, and then send the DOCSIS physical layer format-based data to the DOCSIS physical layer module 803.

The DOCSIS physical layer module 803 is further configured to receive the DOCSIS physical layer format-based data of the radio-frequency module 804, finish processing of an upstream multichannel physical layer signal, and send the processed signal to the PON adaptation module 802.

The PON adaptation module 802 is further configured to perform scheduling and traffic shaping on the received signal after the processing of the upstream channel physical layer signal, add a specific logical channel number, and send the signal to a PON physical layer chip, convert the signal into PON physical layer format-based data, and send the data to the second PON physical layer module 801.

Figure 9:
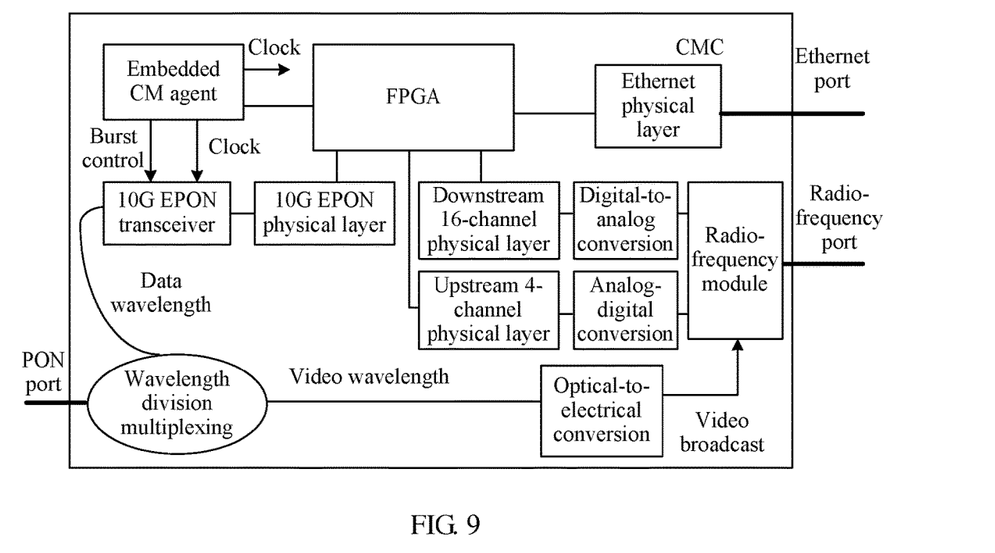
FIG. 9 is a schematic diagram of the composition principle of a CMC according to Embodiment 2 of the present invention.

In addition, it should be noted that, as shown in the schematic diagram of the composition principle of CMC in FIG. 9: the CMC includes a PON interface, a radio-frequency interface, and an Ethernet port, where the PON interface receives the PON physical layer format-based data, and then separates out an analog radio-frequency signal. The analog radio-frequency signal is transmitted through a 1550 nm wavelength, a data wave signal and the analog signal are multiplexed through wavelength division multiplexing on the passive optical network, and the signal is converted into a video radio-frequency signal by using an analog optical receiver, and is sent to the terminal device by using the radio-frequency interface. In addition, after the data processed by the PON adaptation module is processed by the Ethernet physical layer, the data is directly sent by using the Ethernet port.

Each CMC can support 50-500 terminal devices, and the terminal device may be a Docsis 2.0/3.0 CM.

In the CMC provided by the embodiment of the present invention, a PON physical layer module receives and sends PON physical layer format-based data; a PON adaptation module forwards the PON physical layer format-based data to a DOCSIS physical layer module after finishing packet caching, traffic classification, filtering, and rate matching; the DOCSIS physical layer module finishes processing of a downstream multichannel physical layer signal, outputs DOCSIS physical layer format-based data, and sends the DOCSIS physical layer format-based data to a radio-frequency module; and the radio-frequency module modulates the DOCSIS physical layer format-based data to a radio-frequency interface and send it to a terminal device. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, and system efficiency is improved.

An embodiment of the present invention provides a DOCSIS protocol-based access method. As shown in FIG. 4, the method includes the following steps.

Step 401: Receive DOCSIS protocol-based data on a media access control MAC layer.

Specifically, the DOCSIS protocol-based data is received on the MAC layer of the CMTS device.

Step 402: Convert the DOCSIS protocol-based data into PON physical layer format-based data by using a passive optical network PON physical layer module disposed inside or outside.

The PON physical layer module is a 10 G EPON physical layer module, and the PON physical layer module is disposed inside or outside the CMTS device, so that a topological structure of a passive optical network is supported between a DOCSIS CMTS and an optical node.

Specifically, the CMTS device includes a DOCSIS MAC module. The DOCSIS MAC module is connected to the PON physical layer module by using a downstream external physical layer interface DEPI and an upstream external physical layer interface UEPI, and the PON physical layer module is used to convert the DOCSIS protocol-based data into the PON physical layer format-based data.

It should be noted that, the DEPI can support eight to sixteen downstream physical channel bindings of 6 MHz or 8 MHz, where different DEPIs correspond to different logical channel numbers, and the different DEPIs are identified by using different downstream service groups DS-SGs. The UEPI supports four upstream physical channel bindings of A-TDMA or S-CDMA, where different UEPIs correspond to different logical channel numbers, and the different UEPIs are identified by different upstream service groups US-SGs.

Step 403: Send the PON physical layer format-based data to a PON optical module, and the PON optical module sends the PON physical layer format-based data to a coax media converter by using a fiber.

The PON physical layer module in the coax media converter receives the PON physical layer format-based data from the CMTS device.

In the DOCSIS protocol-based access method provided by the embodiment of the present invention, DOCSIS protocol-based data is received on a MAC layer, then the PON physical layer module converts the DOCSIS protocol-based data into PON physical layer format-based data, and sends the PON physical layer format-based data to a PON optical module, and the PON optical module sends the PON physical layer format-based data to the coax media converter by using a fiber. Compared with the prior art that, when a data packet is transferred, a whole system is divided into an EPON domain and a DOCSIS domain which are independent, in which case end-to-end cannot be achieved, and efficiency is low, in the solution provided by the embodiment of the present invention, a first PON physical layer module is disposed inside or outside a CMTS device, so that a point-to-multipoint PON topological structure is supported by a physical connection between a DOCSIS CMTS and an optical node, system efficiency is improved, a CMTS device integration level is improved, and power consumption of the device is reduced.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A Data Over Cable Service Interface Specification (DOCSIS) protocol-based access system, comprising:
    a cable modem termination system (CMTS) device; and
    a coax media converter (CMC) wherein:
        a first passive optical network (PON) physical layer module is disposed inside or outside the CMTS device,
        the CMTS device is configured to receive DOCSIS protocol-based data, convert the DOCSIS protocol-based data into PON physical layer format-based data by using the first PON physical layer module, and send the PON physical layer format-based data to the CMC through an optical distribution network,
        the CMC is configured to receive the PON physical layer format-based data, convert the PON physical layer format-based data into DOCSIS physical layer format-based data, and send the converted data to a terminal device,
        a second PON physical layer module, a PON adaptation module, a DOCSIS physical layer module, and a radio-frequency module are disposed inside the CMC, the second PON physical layer module is configured to receive the PON physical layer format-based data from the CMTS device, and send the received data to the PON adaptation module, the PON adaptation module is configured to forward the data from the second PON physical layer module to the DOCSIS physical layer module after finishing packet caching, traffic classification, filtering, and rate matching.

2. The system according to claim 1, wherein
    the first PON physical layer module comprises a PON adaptation module and a 10G EPON (Ethernet PON) physical layer module,
    the PON adaptation module is connected to the DEPI and the UEPI, is connected to the 10G EPON physical layer module by using an SFI-4 (serializer/deserializer framer interface level 4) interface, and is configured to implement conversion of interfaces between the DOCSIS MAC module and the 10G EPON physical layer module, and
    the 10G EPON physical layer module is configured to modulate the DOCSIS protocol-based data into the PON physical layer format-based data, and send the PON physical layer format-based data to the CMC through the optical distribution network.

3. The system according to claim 1, wherein:
    the DOCSIS physical layer module finishes processing of a downstream channel physical layer signal, converts it into DOCSIS physical layer format-based data, and send the converted data to the radio-frequency module, and
    the radio-frequency module is configured to modulate the DOCSIS physical layer format-based data to a radio-frequency interface and send it to the terminal device.

4. The system according to claim 3, wherein the PON adaptation module in the CMC is a field programmable gate array or an application specific integrated circuit (ASIC) chip.

5. The system according to claim 1, wherein the CMC is further configured to extract an analog radio-frequency signal, and convert the analog radio-frequency signal into a video radio-frequency signal by using an analog optical receiver.

6. A cable modem termination system (CMTS) device, comprising:
    a Data Over Cable Service Interface Specification (DOCSIS) media access control (MAC) module; and
    a first passive optical network (PON) physical layer module, wherein
        the DOCSIS MAC module is provided with a downstream external physical layer interface (DEPI) and an upstream external physical layer interface (UEPI),
        the DEPI and the UEPI are configured to connect to the PON physical layer module,
        the DOCSIS MAC module is configured to send DOCSIS protocol-based data to the PON physical layer module by using the DEPI, and receive DOCSIS protocol-based data from the PON physical layer module by using the UEPI,
        the PON physical layer module is provided with at least one PON interface,
        the PON interface is configured to connect to a passive optical distribution network,
        the PON physical layer module is configured to convert PON physical layer format-based data from the passive optical distribution network into DOCSIS protocol-based data, and is configured to modulate the data from the DOCSIS MAC module into PON physical layer format-based data, and send the PON physical layer format-based data to a coax media converter (CMC) through the optical distribution network, and the CMC comprises a PON adaptation module, configured to forward the PON physical layer format-based data received from CMTS to a Data Over Cable Service Interface Specification (DOCSIS) physical layer module after finishing packet caching, traffic classification, filtering, and rate matching.

7. The CMTS device according to claim 6, wherein the PON physical layer module is a 10G EPON (10 Gbit/s Ethernet passive optical network) physical layer module.

8. A coax media converter (CMC), comprising:
    a passive optical network (PON) physical layer module, configured to receive and send PON physical layer format-based data; and
    a PON adaptation module, configured to forward the PON physical layer format-based data from the PON physical layer module to a Data Over Cable Service Interface Specification (DOCSIS) physical layer module after finishing packet caching, traffic classification, filtering, and rate matching, wherein
        the DOCSIS physical layer module is configured to finish processing of a downstream multichannel physical layer signal, output DOCSIS physical layer format-based data, send the DOCSIS physical layer format-based data to a radio-frequency module, receive DOCSIS physical layer format-based data of the radio-frequency module, finish processing of an upstream multichannel physical layer signal, and send the processed signal to the PON adaptation module, and the radio-frequency module is configured to modulate the DOCSIS physical layer format-based data to a radio-frequency interface and send it to a terminal device.

9. The CMC according to claim 8, further comprising:
a video relay module configured to separate out an analog radio-frequency signal, and convert the analog radio-frequency signal into a video radio-frequency signal by using an analog optical receiver.

10. The CMC according to claim 8, wherein the PON adaptation module is a field programmable gate array or an application specific integrated circuit (ASIC) chip.

11. A Data Over Cable Service Interface Specification (DOCSIS) protocol-based access method, comprising:

receiving DOCSIS protocol-based data on a media access control (MAC) layer;

converting the DOCSIS protocol-based data into passive optical network (PON) physical layer format-based data by using a PON physical layer module disposed inside or outside;

sending the PON physical layer format-based data to a PON optical module;

sending, by the PON optical module, the PON physical layer format-based data to a coax media converter (CMC) by using a fiber; forwarding the PON physical layer format-based data from the CMC after finishing packet caching, traffic classification, filtering, and rate matching; converting the forwarded PON physical layer format-based data into DOCSIS physical layer format-based data; and sending the converted DOCSIS physical layer format-based data.

12. The method according to claim 11, wherein the PON physical layer module is a 10G EPON (10 Gbit/s Ethernet passive optical network) physical layer module.

* * * * *